RANDOM SCANNING METHOD AND SYSTEM FOR IDENTIFYING CORRESPONDING DETAIL IN TWO STEREO IMAGES

Filed Jan. 13, 1958 4 Sheets-Sheet 1

Inventor
GILBERT L. HOBROUGH
by: J. Richard Cavanagh
Patent Agent

Inventor
GILBERT L. HOBROUGH
by: J. Richard Cavanagh
Patent Agent

Inventor
GILBERT L. HOBROUGH
by: J. Richard Cavanagh
Patent Agent

Dec. 13, 1960 G. L. HOBROUGH 2,964,643

RANDOM SCANNING METHOD AND SYSTEM FOR IDENTIFYING CORRESPONDING DETAIL IN TWO STEREO IMAGES

Filed Jan. 13, 1958 4 Sheets-Sheet 4

Inventor
GILBERT L. HOBROUGH
by: J. Richard Cavanagh
Patent Agent

United States Patent Office 2,964,643 Patented Dec. 13, 1960

2,964,643

RANDOM SCANNING METHOD AND SYSTEM FOR IDENTIFYING CORRESPONDING DETAIL IN TWO STEREO IMAGES

Gilbert Louis Hobrough, Oshawa, Ontario, Canada, assignor, by mesne assignments, to Hunting Survey Corporation Limited, Toronto, Ontario, Canada Filed Jan. 13, 1958, Ser. No. 708,653

14 Claims. (Cl. 250—220)

This invention relates to a method and system for identifying corresponding detail in two images, and more specifically to improvements in photogrammetric methods and apparatus for simultaneously locating corresponding points in two similar stereo images.

This invention embodies improvements in the methods and apparatus disclosed in my prior applications 604,843 for Image Inspecting System and Method, 679,978 for Methods and Apparatus for Correlating Corresponding Points in Two Images, and 696,394 for Method and Apparatus for Locating Corresponding Areas of Two Similar Images, the said prior applications having been assigned to the same assignee as this application.

In the said prior applications a method of inspecting an image to obtain information to define a point therein is disclosed. Information is sensed from the image about the point to be defined, and an electrical signal is generated, responsive to the information sensed, whereby the signal and the information contained therein identify said point. The said applications also disclose a method and apparatus for identifying corresponding points in two images such as stereoscopic photographic pairs, each having similar information about the point therein. One of the images is scanned about the point over a predetermined area and at a predetermined scanning rate. The other image is scanned at a corresponding rate over an area of a size similar to that of the predetermined area of the first scan. An electrical error signal is generated responsive to lack of similarity of the information scanned on the images. The error signal may be applied to correct the position of the second scan. The error signal becomes zero when both scans are in perfect alignment with corresponding points in the two images. In addition to the foregoing, the said applications disclose simultaneous expansion of both of the scanning patterns, sufficient to achieve a condition of correlation over large areas, though the scans may not be aligned exactly on corresponding points.

In the said prior applications the lack of correlation between the scans could be translated into co-ordinate information for the direction in which correction was required by utilizing a circular scanning pattern of slightly different size in one scan than in the other scan in a so-called "constant difference scanning method," so that under conditions of perfect alignment a uniform correlation signal would be obtained. If misalignment occurred in any direction a non-uniform correlation condition existed, from which an error signal could be derived containing phase and amplitude information corresponding to the direction of misalignment and the magnitude of the alignment error.

The method and apparatus of application 679,978 enable improved alignment under conditions of non-uniform correlation. Corresponding scanning spots of similar size operate in the same direction on the same momentary scanning path or trace in both scans simultaneously, but the signal obtained from one of the scans has a fixed delay applied thereto, whereby to obtain a constant delay difference in a constant difference scanning method. The improvement herein set forth also embodies a further modified scanning method in which a balanced delay difference system is set forth whereby better to define misalignment directional information.

In the last of the said applications corresponding areas of two similar images containing similar information are scanned by moving a scanning spot simultaneously over each image on a momentary path of predetermined direction. The information encountered by the scanning spot in each image is sensed, or detected and a transient signal is generated responsive thereto and hence responsive to the information sensed in each image. The transient signals thus obtained are then processed to establish a single order differential difference therebetween, such as by differentiating one of the signals or by differentiating both of the signals, but in the latter case one of the signals is differentiated to the second degree. By this means the transient signals are rendered of improved significant information content. The transient signals having a single order of differential difference are then discriminated with respect to time in order to measure the time difference therebetween. An error signal is then generated responsive to the thus measured time difference and thereby responsive to the positional error of the scanned area on the images.

The use of known scanning patterns for the extraction of information from stereoscopic image pairs suffers from a number of disadvantages. A repetitive scanning pattern will effect a restricted directional scanning as a result of which the finite area or detail may be scanned in one direction only. This may give rise to insufficient information or erroneous information if the detail or its boundary is itself directional as is often the case. In addition, known regular repetitive scanning patterns tend to achieve a uniform scanning coverage of a large area, so that all portions of the image are of the same effective significance. Any known regular repetitive scanning pattern will interact with an image configuration to produce an effective anomalous reaction or signal. Finally, of those known regular scanning patterns having a scanning spot motion of constant velocity there is no sensitivity obtainable as to the difference between fine and coarse detail.

It is the main object of the present invention to overcome the disadvantages of regular repetitive scanning patterns in methods and systems of the invention for simultaneously examining two similar images to identify, locate or define corresponding points, similar detail and/or to achieve image detail registration by utilizing a truly random scanning pattern for the scanning of such images.

It is a further object of the invention to effect a random scanning of an image in all directions, so that image information is abstracted in many permutations.

It is a further object of the invention to generate a noise signal and to scan an image area in random directions and amplitudes responsive to said noise signal to achieve a random scanning weighting the overall scanning effect in favour of a scanning axis intersecting the image at the point to be defined by the scanning operation. It is a still further object of the invention to provide an irregular and constantly changing scanning pattern which does not interact with any image configuration, thereby to avoid anomalies in the information obtained from the image.

It is a still further object of the invention to provide a scanning method and system in which the motion of the scanning spot is of random velocity thereby continuously and automatically maintaining a sensitivity to both fine and coarse detail in the image.

Figure 1:
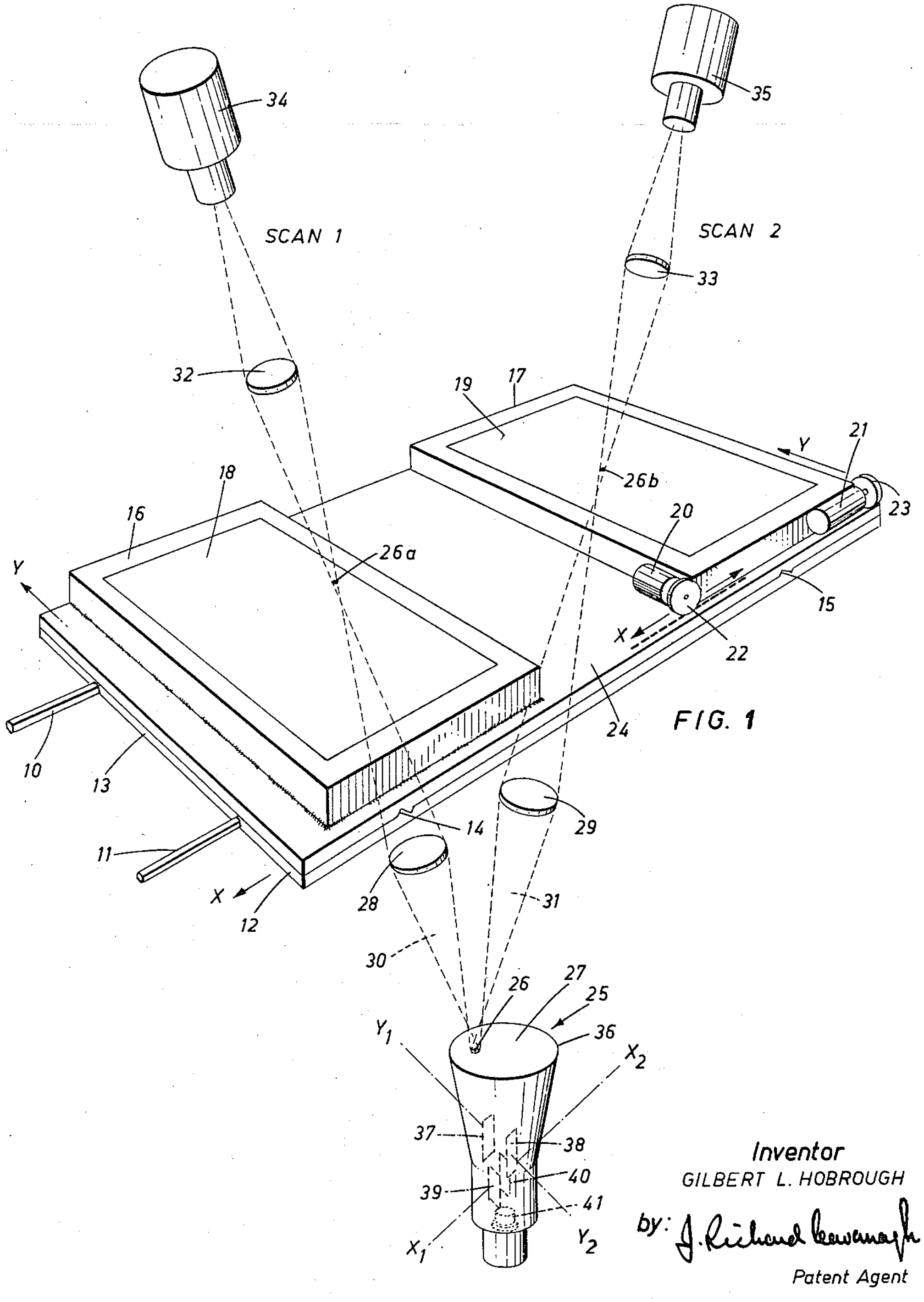
Figure 1 is a diagrammatic perspective of apparatus useful for the scanning of a stereoscopic or other pair of similar images by the method and system herein.

In the drawings a preferred form of scanning system according to the invention is illustrated in Figure 1, in which stationary parallel spaced apart rails 10 and 11 slidably carry a base 12 adjustable slidably therealong in an X co-ordinate direction for example. This component may be referred to hereinafter as an X base member. A Y base member 13 overlies the X base member but is adjustably slidable on mutual guides 14 and 15. Image frames 16 and 17 are each adapted to mount one image of similar image pairs, such as stereographic image pairs or other images desired to be compared or registered and designated by numerals 18 and 19. Image frame 16 is fixed to Y co-ordinate member 13, whereas image frame 17 is movable on said member in X and Y co-ordinate directions indicated, either manually or preferably automatically by an X drive motor 20, and a Y drive motor 21, fastened thereto and effecting co-ordinate drive motion by friction drive wheels 22 and 23 respectively, along the upper surfaces 24 of Y co-ordinate member 13. For purposes of the invention the co-ordinate members 12 and 13 and the image frames 16 and 19 embody relatively large openings (not shown) beneath the images 18 and 19 to permit passage of light through the images at various relative positions of the co-ordinate members and the image frames.

According to the invention, a single cathode ray tube 25, or equivalent scanning spot generating device, is utilized to provide a scanning spot 26 on the screen 27, adapted to be projected by optical means such as lenses 28 and 29 about scanning axes 30 and 31, sometimes hereinafter referred to as scan one and scan two, to provide an image *26a* of the scanning spot on the image plane of image 18 and a simultaneous image *26b* on the image plane of image 19. The density of image detail encountered by the scanning spot in each image will determine the density or brightness of the spot images *26a* and *26b*, which latter are optically resolved through a suitable lens system comprising lenses 32 and 33 for energization of conventional photocell detector devices 34 and 35 disposed on the optical axis of each scan.

Where the scanning pattern generator device 25 is in the form of a cathode ray tube 26 of the deflection plate type shown, the deflection plates 37 and 38 may be utilized for Y co-ordinate pattern control and the deflection plates 39 and 40 utilized for X co-ordinate pattern control of a pattern generating electron stream emitting from gun structure 41, and providing a scanning spot 26 on screen 27. The energization of the cathode ray tube 36 is conventional for the formation of a scanning pattern with the important exception of the nature of the signal used for deflecting the electron stream and hence providing the form of scanning pattern desired. The scanning pattern of the invention in the ideal case is desired to be truly random about the scanning axis, whereby to achieve a maximum probability of information extraction at the scanning axis and a lesser probability radially therefrom in accordance with a well-known probability curve distribution. This may be accomplished by utilizing a cathode ray tube pattern control circuit of the nature set forth in Figure 2 having an X co-ordinate noise generator 42 and a Y co-ordinate noise generator 43 from which the noise signal generated by each is suitably filtered by filters *43a* and 44 to restrict the noise signal spectrum to appropriate limits, having regard to the limited frequency response of any following circuitry. Amplifiers 45 and 46 are adapted to apply deflection signals to the X and Y deflection plates 39, 40, and 37, 38 of the cathode ray tube 36 of Figure 1.

Figures 2, 3:
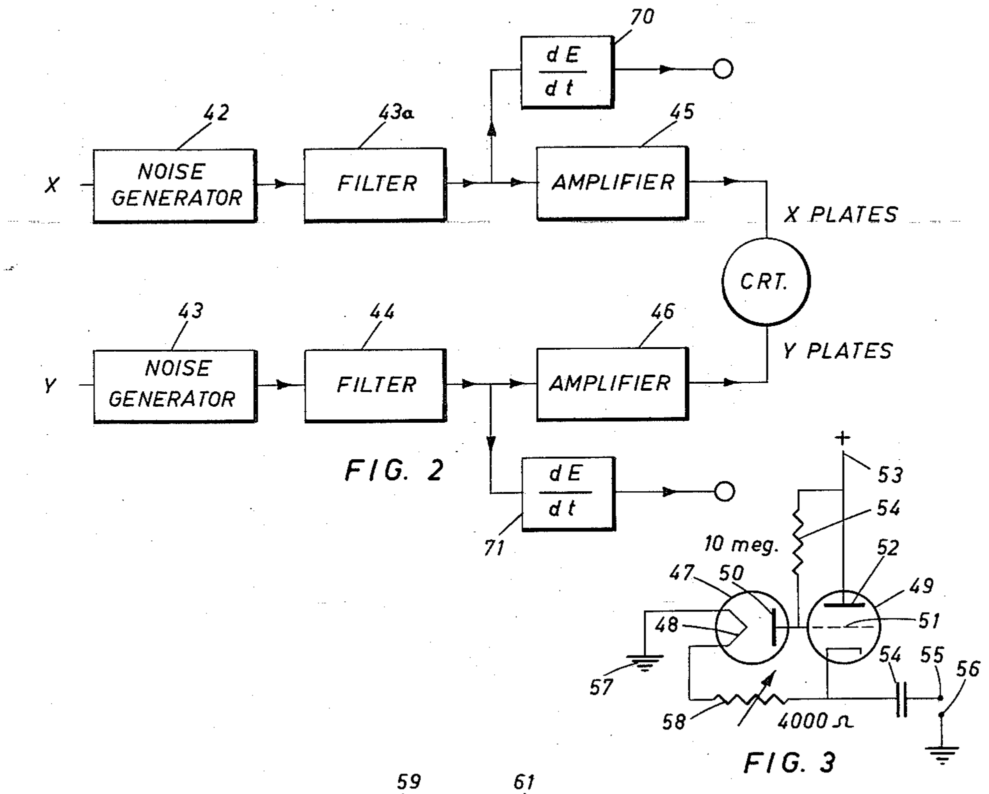
Figure 2 is an electrical schematic block diagram of known electronic components arranged and combined according to the invention to provide a random scanning pattern for the cathode ray tube of Figure 1.
Figure 3 is an electronic schematic of one suitable form of noise generator useful in the circuit arrangement of Figure 2.

The preferred form of noise generator utilized at 42 and independently at 43 may be that illustrated in Figure 3. A filamentary cathode diode 47 which may be in the form of a pentode in diode connection provides a shot noise emmission from the cathode element 48 of truly random noise content which is amplified by triode 49 by direct coupling of diode plate 50 to triode grid 51, thereby modulating the current flow through the triode 49 according to the shot noise signal. Plate 52 of triode 49 is connected to suitable positive voltage source 53 to which plate 50 of diode 47 is also connected through the high value resistor 54 effecting operation of diode 47 with high noise output. The amplified signal from triode 49 is cathode coupled by coupling means 54 to terminals 55 and 56 which may represent the terminals of following circuitry to which a low impedence connection is desired.

It will be observed that the filament cathode 48 of diode 47 is series connected with triode 49 across the voltage source, that is between the positive source 53 and ground 57. The rate of current flow being determined by the series potentiometer 58 of the order of four thousand ohms in the example given. It has been found that the form of noise generator illustrated in Figure 3 is essentially self-regulating and provides a satisfactory noise signal for purposes of the invention of ideal random character. It will therefore be understood that the utilization of a noise signal of the kind disclosed herein for a deflection signal for X co-ordinate deflection plates of a cathode ray tube in conjunction with the utilization of an independent or separate noise signal as a deflection signal for the Y co-ordinate deflection plates of a cathode ray tube will give rise to a random scanning trace by a scanning spot formed by the electron stream on the cathode ray tube and the cathode ray screen. A random scanning pattern will be accomplished by the scanning spot moving in any direction at any velocity at any moment. The probability of the scanning spot traversing the centroid of the screen area of the cathode ray tube is higher than for any other point in the screen. The probability becomes less for any point more distant from the centroid in accordance with a theoretical probability function. Thus the scanning density is a maximum at the centre and of lesser value progressively outwardly therefrom.

Figure 4:
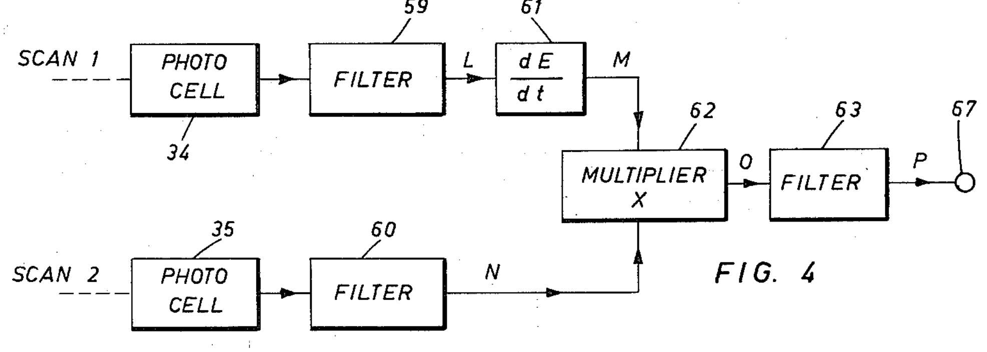
Figure 4 is an electronic schematic block diagram of an information signal processing system for information signals obtained from the two scanned images simultaneously for obtaining an instantaneous registration error signal therefrom.

The processing of signals obtained from the photocells 34 and 35 of Figure 1 is illustrated in Figure 4, wherein like numerals indicate like components. The signal from each of the photocells is filtered by filters 59 and 60 respectively to remove direct current and high frequency noise components therefrom. One of the scan signals, hereinafter referred to as an information signal, is subjected to a single order differentiation by a conventional electronic differentiating device 61 provided in the form of any of the well-known differentiating networks. The differentiated signal from scan one as illustrated in Figure 4 is then multiplied with the filtered information signal from scan two by conventional electronic multiplier 62 to obtain a utilizable signal which may be filtered by filter 63 to effect smoothing thereof, of an amplitude and sign proportional to any time difference existing between the information signals obtained from scan one and scan two.

It is preferred that the photocell selection be made to provide a response therefrom which is a logarithmic of light intensity, whereby to reduce the effect of a large vibration in mean image density, while at the same time resolving small density differences from point to point. The filters 59 and 60 are band pass filters designed to attenuate shot noise arising out of the corpuscular nature of light at low intensities. These filters also effectively differentiate the information signal so as to accentuate image boundary signals. As a result of the action of these filters together with the effect of the size of the scanning spot (which should be assumed to be constant at this stage of the discussion herein) the electrical signal produced by the traverse of the spot over sharp boundaries from a dark to a light area and back to a dark area again is represented by the curve 64 of Figure 5 where boundaries 65 and 66 exist between two dark areas and a light therebetween.

Figure 5:
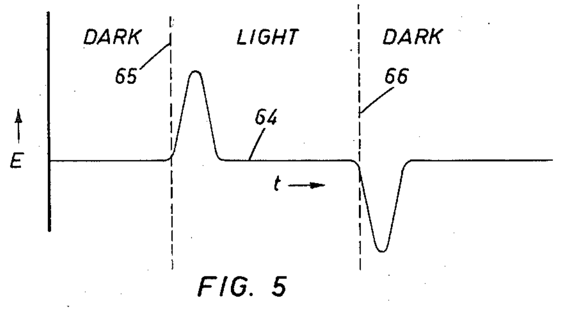
Figure 5 illustrates an ideal form of transient signals for the traverse of a scanning spot over image detail boundaries where the height of the transients are a measure of the density difference across the boundaries.

A transient information signal of the general kind shown in Figure 5 is produced whenever a scanning spot traverses an image detail boundary. Any image is made up of small areas of different density separated by boundaries. It is these boundaries which contain information useful for alignment, registration, and/or correlation purposes of the invention. The height of the transient information signal is a measure of the density difference across the boundary.

Figures 6, 7, 8:
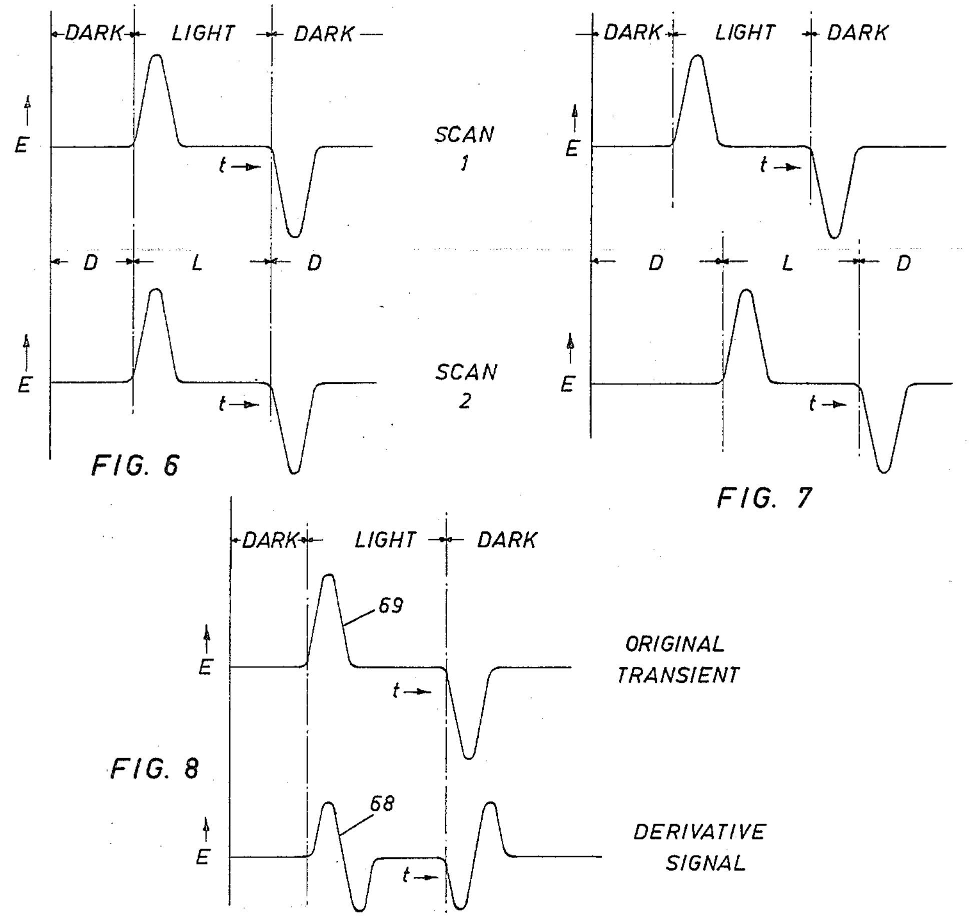
Figure 6 illustrates the relative timing of transient information signals obtained from the two images when the scanning spot traverses boundaries, as in Figure 5, under conditions of perfect alignment of the optical or scanning axis on corresponding points in the two images.
Figure 7 illustrates ideal image information signal wave forms for each image for a condition of misalignment of the scanning axes in the direction of scanning, such that A scanning spot is in advance of the B scanning spot with respect to its image i.e. the A spot reaches each boundary effectively ahead of the B spot.
Figure 8 illustrates the effect of differentiating an original transient information signal wherein the derivative signal is proportional to the slope of the original signal at any point.

Having regard to the foregoing, if similar mutually oriented images be assumed in the system of Figure 1 wherein the scanning axes are intersecting identical points in the images, the relative timing of the information transient signals in channel one and channel two when the scanning spot traverses boundaries as in Figure 5, may be represented as in Figure 6, illustrating a condition of perfect alignment of the optical axes on corresponding image points. The designations D and L in Figure 6 and following figures indicate portions of the signals responsive to dark and light areas respectively. The letter E indicates that the wave form is of voltage wave form character in these figures.

If the images are subject to a condition of slight misalignment in a direction of motion of the scanning spot at a given instant such that the scanning spot in scan one reaches each image boundary ahead of the scanning spot in scan 32, then the transient information signals will be different in time and the signal on scan two will be delayed with respect to the signal of scan one, as indicated in Figure 7. The voltage curves of Figures 6 to 9 are drawn on a time basis to enable comparison of the delay character of one of the information signals due to misalignment. The above discussed signal wave forms are representative of those occurring in the ideal case for filtering by filters 59 and 60 of Figure 4. The remainder of the circuitry illustrated utilizes the difference in transient timing to obtain an instantaneous alignment error signal at output terminal 67. Thus the differentiating network 61 operates on scan one signals to produce a derivative function thereof. Figure 8 illustrates the effect of the differentiating device on boundary transients similar to Figure 5. It can be seen that the derivative signal 68 is proportional in magnitude to the slope of the original information signal 69 at any point. The multiplying circuit 62 combines the filtered channel two signal with the differentiated channel one signal to provide an output wave form of an amplitude which is the product of their instantaneous values.

Figure 9:
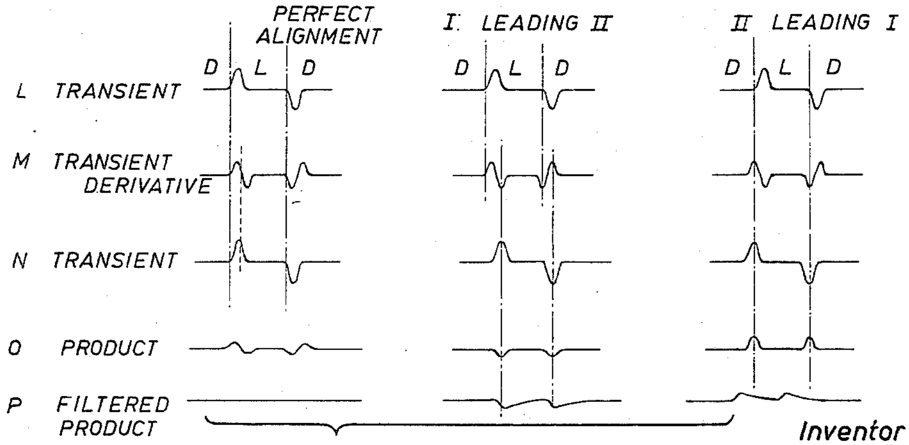
Figure 9 is a wave form diagram illustrating the operations accomplished on the original transient information signals by the circuitry of Figure 4.

Thus, in Figure 9 the overall function of the components of Figure 4 is illustrated wherein transient information signal wave forms are shown at points L, M, N, O and P in the circuitry of Figure 4 for a condition of perfect alignment, for a condition where scan one leads scan two, and finally being a condition where scan two leads scan one. It will be observed that the output of the multiplier 62, as represented by the product wave forms, is predominantly positive or negative depending upon the direction of misalignment of the scanning or optical axis with respect to the instantaneous scanning direction. The purpose of the filter 63 is to smooth the output wave forms of the product to obtain an error signal represented by the filtered product which is responsive in amplitude and sign to the magnitude and direction of alignment error. By reason of the function of the circuitry of Figure 4 just described it may sometimes be referred to herein as an alignment or registration discriminator characterized by the following:

(*a*) Under a condition of perfect alignment, i.e. registration of the optical or scanning axes of scan one and scan two intersecting corresponding points in the two images 18 and 19 of Figure 1, the error signal, i.e. the filtered product at P, is zero.

(*b*) Under conditions of misalignment a positive or negative error signal will be available depending upon the direction of misalignment with respect to the direction of the scanning spot.

(*c*) Misalignment in a direction at right-angles to an instantaneous direction of scanning will deliver an instantaneous value of error signal of zero magnitude.

Assuming a scanning pattern which is truly random an error signal will be produced in the ideal case which is also of the random type. In such instance the error signal will be zero whenever the scanning direction happens to be at right-angles to the direction of misalignment. In addition the sign of the error signal will reverse whenever the scanning direction reverses. Accordingly, the invention contemplates that the extraction of a steady misalignment signal useful for corrective purposes must embody a resolution of the error signal into two co-ordinate components, for example, X and Y co-ordinate components, wherein the dependence of the sign of the error signal on scanning direction is suppressed. One preferred system for accomplishing this objective is illustrated in Figure 10, showing the utilization of an error signal according to the method of the invention for the energization of co-ordinate drive motors for X and Y co-ordinate reference, applicable to the automatic shifting of one image frame such as frame 17 in Figure 1, thereby automatically to achieve alignment or registration of identical image detail intersected by the scanning axes in the two images.

Figure 10:
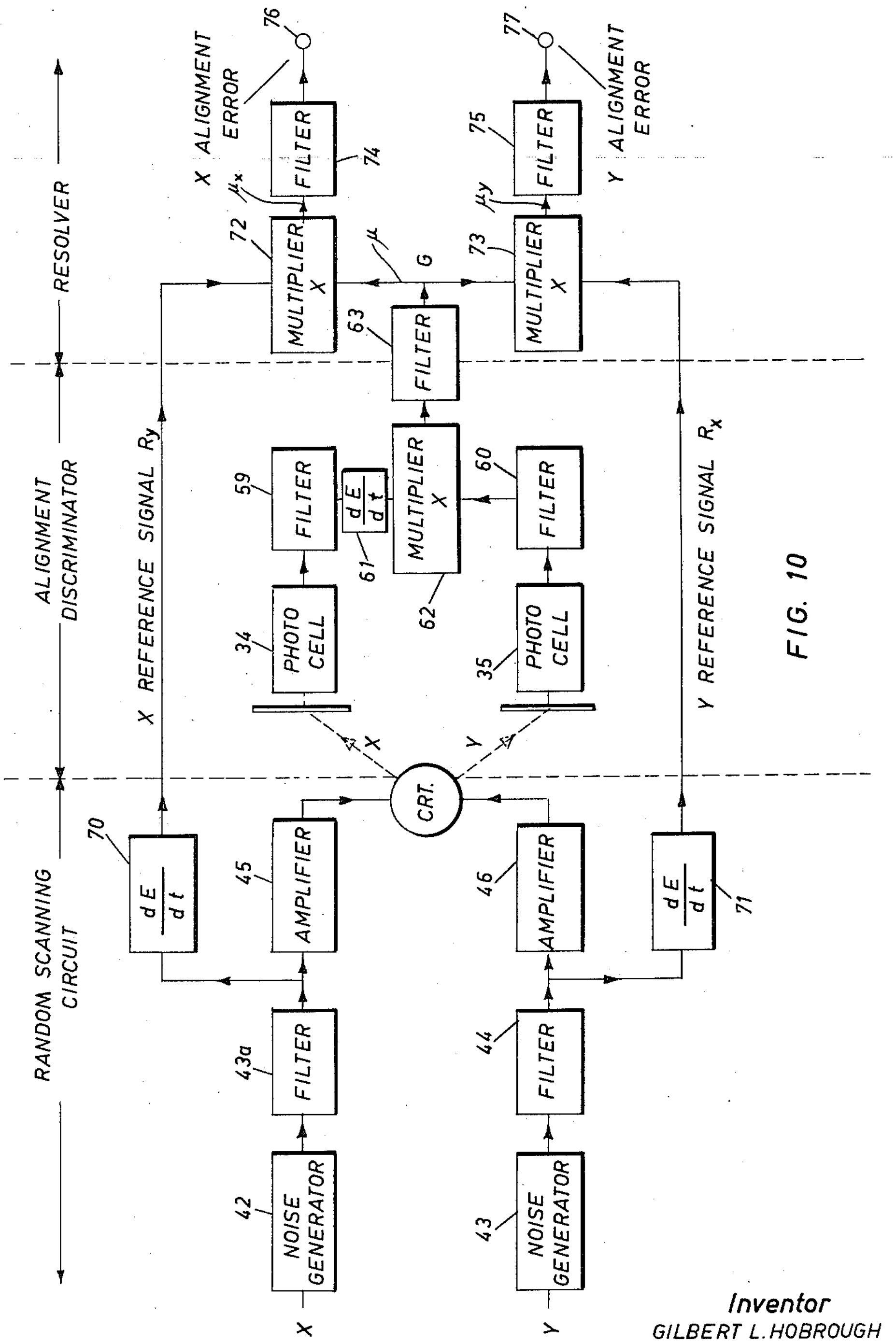
Figure 10 is a functional block diagram of the complete method and system of the invention.

In Figure 10 like numerals indicate like components, as compared with previous figures. In Figure 10 the X reference signal and Y reference signal are obtained by differentiating noise signals from the random scanning circuit. The X noise signal is differentiated by the differential device 70 to obtain an X reference signal, and the Y co-ordinate noise signal is differentiated by the differentiating device 71 to obtain a Y signal. The sign and amplitude of these differentiated signals will be a function of the direction and velocity of the scanning spot. The X reference signal is multiplied with the error signal at G by multiplier 72. The Y reference signal is multiplied with the error signal at G by the multiplying device 73. Resulting output signal from the multipliers 72 and 73 is filtered by suitable low-pass filters 74 and 75 respectively, to provide X alignment error signal at 76 and Y alignment error signal at 77. The right hand part of the circuitry beyond the alignment discriminator section is designated as a resolver. The function of the resolving circuit portion is as follows:

Assume that a misalignment in the X direction is present. In this case the following action will take place:

*Case 1.*—Spot moving in the Y direction (Figure 10).

$$\text{Output } \mu = \text{zero}$$

therefore $\mu_x$ and $\mu_y$ are both zero since one of the factors multiplied is zero in each case.

*Case 2.*—Spot moving in the X direction such that $\mu$ is positive and X reference is positive.

(*a*) Since spot velocity in the Y direction=zero therefore $$R_y = \text{zero}$$

therefore $$\mu_y = \text{zero}$$

(*b*) $\mu_x$ is positive since both factors $R_x$ and $\mu$ are positive.

*Case 3.*—Spot direction reversed over 2 above therefore $\mu$ is negative and $R_x$ is negative. Therefore $R_x$ is positive since both factors multplied are negative.

It can be seen that the $\mu_x$ signal is not dependent on the direction of scan and that an X alignment error produces a zero $\mu_y$ signal.

Similarly by assuming a misalignment in the Y direction it can be shown that a consistent $\mu_y$ signal is produced with $\mu_x$=zero.

During random scanning under conditions of misalignment in say the X direction, the error signal $\mu_x$ will fall to zero whenever the scanning spot is stationary or is moving in a Y direction. The error signal will be maximum when the spot is moving in an X direction. The purpose of the filters 74 and 75 is to smooth out these fluctuations to provide continuous X and Y alignment error signals suitable for excitation of servo amplifiers which may be used to correct the alignment error.

In a general sense the invention concerns a system for identifying corresponding detail in two similarly oriented images having similar information on co-ordinates therein. A scanning axis is established for each of the images by a suitable optical system adapted to form an image of a spot from a cathode ray tube screen in the plane of each of the images simultaneously so that effectively a scanning spot is generated simultaneously on each of the images in identical relation with the scanning axis of each. At least two independent co-ordinate random signals are generated such as by means of an electronic noise generator and the cathode ray tube spot is caused to be deflected in a co-ordinate sense by each of each random signals thereby to effect a simultaneous random scanning of each of the images about the scanning axis thereof. The information encountered by the scanning spot on each of the images is sensed independently in each image. A transient information signal for each image is then generated responsive to the information sensed therefrom. A misalignment in a particular co-ordinate direction may be measured as a difference in effective timing between that portion of the transient signals corresponding to the particular co-ordinate direction. As a result, means are provided for developing a co-ordinate error signal for each random signal scanning co-ordinate direction responsive to the effectively relative difference in time in the information signals. In a more specific sense the time difference between the transient information signals is utilized to provide an error signal which is independently processed with each of the co-ordinate random signals thereby to obtain an error signal for each co-ordinate sense. The resulting co-ordinate error signals may then be utilized for moving one of the images relative to its scanning axis i.e. moving either the scanning axis or the image to reduce the error signals to zero at which alignment of corresponding detail on the two scanning axes is achieved.

In a general sense the invention also concerns improvements in methods of scanning corresponding areas of two images each containing similar information comprising generating an independent random signal for controlling the nature of the scanning pattern. A random signal is used for controlling each co-ordinate sense desired in the scanning pattern. Thus for a cartesian co-ordinate scanning pattern system there would be a Y co-ordinate random signal determining the Y co-ordinate motion of the scanning spot and an X co-ordinate random signal determining the X co-ordinate motion of the scanning spot. Similarly random signals may be independently used for scanning pattern generation in a polar co-ordinate system. The scanning pattern so generated is utilized simultaneously on each of the images to achieve effectively a maximum probability of scanning of image information at the scanning axis about which the scanning pattern is generated.

Reference is made herein to co-ordinate random signals that is, the noise signals generated for use in determining the nature of the scanning pattern obtained. While generation of a random signal from the shot noise of a filament heater diode has been described as one preferred way of practicing the invention it is desired to point out that this form of noise generator can be used because of certain characteristics of the signals produced thereby. The use of any other random signal generator should, according to the invention, take into account the inherent band width of the random signal produced. Thus in the example of the invention the bandwidth of the random signal produced is of the order of 2000 cycles of a lower frequency limit of the order of 200 cycles per second. The lower frequency limit determines the resolution of the system, and the sensitivity to fine image detail.

If the lower frequency limit is set too low, for example of the order of 10 cycles per second, the entire scanning pattern may tend to wander.

The effect of light on the photoelectric cell or other sensing means gives rise to light generated noise of continuous spectrum which, it will be realized, may be superimposed on the information signal desired for use according to the invention. This interference with the operation of the system can be substantially if not effectively entirely eliminated by limiting the upper frequency of the co-ordinate random signal. Handling circuitry may correspondingly limit the upper frequency response following the photocells thereby effectively providing a bandpass condition for substantially only the information desired.

It should be realized that while the generation of a co-ordinate random signal is accomplished preferably by utilization of a noise generator in the true sense, a synthetic noise signal or random appearing signal may be provided by a conventional function generator and recording means whereby for example an endless recorder tape could provide an effectively random signal of desired bandwidth of substantial ideal spectrum for the purposes intended. It will therefore be understood that the term co-ordinate random signal or co-ordinate noise signal is intended to embrace synthetic signals of the same general character.

What I claim as my invention is:

1. A system for identifying corresponding detail in two similarly oriented images having similar information on co-ordinates therein and comprising: means establishing a scanning axis for each of said images; means for generating a scanning spot simultaneously on each of said images in identical relation with the scanning axis of each; means for generating at least two independent co-ordinate random signals; means associated with said means generating said scanning spot and responsive to said random signals imparting random co-ordinate motion simultaneously to both said scanning spots thereby effecting simultaneous random scanning of each of said images about the scanning axis thereof; means for independently sensing the information encountered in each image by the scanning spot therefor; means generating a transient information signal for each image responsive to the information sensed by said sensing means; and means providing a co-ordinate error signal for each random signal scanning co-ordinate direction responsive to a relative difference in timing of said information signals.

2. A system for identifying corresponding detail in two similarly oriented images having similar information on co-ordinates therein and comprising: means establishing a scanning axis for each of said images; means for generating a scanning spot simultaneously on each of said images in identical relation with the scanning axis of each; means for generating at least two independent co-ordinate random signals; means associated with said means generating said scanning spot and responsive to said random signals imparting random co-ordinate motion simultaneously to both said scanning spots thereby effecting simultaneous random scanning of each of said images about the scanning axis thereof; means for independently sensing the information encountered in each image by the scanning spot thereof; means generating a transient information signal for each image responsive to the information sensed by said sensing means; means providing an error signal responsive to a relative difference in timing of said information signals; and means providing a co-ordinate error signal responsive to said error signal and each co-ordinate random signal.

3. A system for identifying corresponding detail in two similarly oriented images having similar information on co-ordinates therein and comprising: means establishing a scanning axis for each of said images; means for generating a scanning spot simultaneously on each of said images in identical relation with the scanning axis of each; means for generating at least two independent co-ordinate random signals; means associated with said means generating said scanning spot and responsive to said random signals imparting random co-ordinate motion simultaneously to both said scanning spots thereby effecting simultaneous random scanning of each of said images about the scanning axis thereof; means for independently sensing the information encountered in each image by the scanning spot thereof; means generating a transient information signal for each image responsive to the information sensed by said sensing means; means providing an error signal responsive to a relative difference in timing of said information signals; means providing a co-ordinate error signal responsive to said error signal and each co-ordinate random signal; and co-ordinate mechanism responsive to each co-ordinate error signal for moving one of said images relative to the scanning axis thereof to correct the co-ordinate position error thereof effectively to reduce the co-ordinate error signal to zero.

4. A system claimed in claim 1 in which the scanning spot generating means comprises: a single cathode ray tube having a cathode ray tube screen upon which a light spot may be formed; and means for projecting an image of said light spot simultaneously to the image plane of both said oriented images.

5. A system claimed in claim 1 in which the scanning spot generating means comprises: a single cathode ray tube having a cathode ray tube screen upon which a light spot may be formed; means for projecting an image of said light spot simultaneously to the image plane of both said oriented images; and a plurality of electronic noise generators each providing a co-ordinate random signal including means for deflecting the scanning spot on the cathode ray tube in a co-ordinate sense responsive to each noise signal.

6. A system claimed in claim 2 in which the scanning spot generating means comprises: a single cathode ray tube having a cathode ray tube screen upon which a light spot may be formed; and means for projecting an image of said light spot simultaneously to the image plane of both said oriented images.

7. A system claimed in claim 2 in which the scanning spot generating means comprises: a single cathode ray tube having a cathode ray tube screen upon which a light spot may be formed; means for projecting an image of said light spot simultaneously to the image plane of both said oriented images; and a plurality of electronic noise generators each providing a co-ordinate random signal including means for deflecting the scanning spot on the cathode ray tube in a co-ordinate sense responsive to each noise signal.

8. A system claimed in claim 3 in which the scanning spot generating means comprises: a single cathode ray tube having a cathode ray tube screen upon which a light spot may be formed; and means for projecting an image of said light spot simultaneously to the image plane of both said oriented images.

9. A system claimed in claim 3 in which the scanning spot generating means comprises: a single cathode ray tube having a cathode ray tube screen upon which a light spot may be formed; means for projecting an image of said light spot simultaneously to the image plane of both said oriented images; and a plurality of electronic noise generators each providing a co-ordinate random signal including means for deflecting the scanning spot on the cathode ray tube in a co-ordinate sense responsive to each noise signal.

10. A system for identifying corresponding detail in two similarly oriented images having similar information on co-ordinates therein and comprising: means establishing a scanning axis for each of said images; means for generating a scanning spot simultaneously on each of said images in identical relation with the scanning axis of each; means for generating at least two independent co-ordinate noise signals; means associated with said means generating said scanning spot and responsive to said noise signals imparting random co-ordinate motion simultaneously to both said scanning spots thereby effecting simultaneous random scanning of each of said images about the scanning axis thereof; means for independently sensing the information encountered in each image by the scanning spot therefor; means generating a transient information signal for each image responsive to the information sensed by said sensing means; and means providing a co-ordinate error signal for each noise signal scanning co-ordinate direction responsive to a relative difference in timing of said information signals.

11. A system for identifying corresponding detail in two similarly oriented images having similar information on co-ordinates therein and comprising: means establishing a scanning axis for each of said images; means for generating a scanning spot simultaneously on each of said images in identical relation with the scanning axis of each; means for generating at least two independent co-ordinate noise signals; means associated with said means generating said scanning spot and responsive to said noise signals imparting random co-ordinate motion simultaneously to both said scanning spots thereby effecting simultaneous random scanning of each of said images about the scanning axis thereof; means for independently sensing the information encountered in each image by the scanning spot therefor; means generating a transient information signal for each image responsive to the information sensed by said sensing means; means providing an error signal responsive to a relative difference in timing of said information signals; and means providing a co-ordinate error signal responsive to said error signal and each co-ordinate noise signal.

12. A system for identifying corresponding detail in two similarly oriented images having similar information on co-ordinates therein and comprising: means establishing a scanning axis for each of said images; means for generating a scanning spot simultaneously on each of said images in identical relation with the scanning axis of each; means for generating at least two independent co-ordinate noise signals; means associated with said means generating said scanning spot and responsive to said noise signals imparting random co-ordinate motion simultaneously to both said scanning spots thereby effecting simultaneous random scanning of each of said images about the scanning axis thereof; means for independently sensing the information encountered in each image by the scanning spot therefor; means generating a transient information signal for each image responsive to the information sensed by said sensing means; means providing a co-ordinate error signal for each noise signal scanning co-ordinate direction responsive to a relative difference in timing of said information signals; and co-ordinate mechanism responsive to each co-ordinate error signal for moving one of said images relative to the scanning axis thereof to correct the co-ordinate position error thereof effectively to reduce the co-ordinate error signal to zero.

13. In the method of scanning corresponding areas of two images each having similar information therein, and in which information is simultaneously and independently sensed from each image by utilizing a scanning spot movable in a co-ordinate sense, the improvement comprising the steps in combination therewith of: generating an independent random signal for each co-ordinate scanning direction desired; moving said scanning spot simultaneously over each of said images in co-ordinate senses responsive to said independent random signals about a scanning axis thereby to achieve a maximum probability of scanning of image information at said axes; generating a transient information signal for each image responsive to the information sensed; measuring the effective time difference between said transient information signals; generating an error signal responsive to said time difference; and processing said error signal with each of said random signals thereby to povide an error signal for each co-ordinate sense.

14. A system for identifying corresponding detail in two similarly oriented images having similar information on co-ordinates therein and comprising: means establishing a scanning axis for each of said images; means for generating a scanning spot simultaneously on each of said images in identical relation with the scanning axis of each; means for generating at least two independent co-ordinate signals; means associated with said means generating said scanning spot and responsive to said co-ordinate signals imparting random co-ordinate motion simultaneously to both said scanning spots thereby effecting simultaneous random scanning of each of said images about the scanning axis thereof; means for independently sensing the information encountered in each image by the scanning spot therefor; means generating a transient information signal for each image responsive to the information sensed by said sensing means; means providing an error signal responsive to a relative difference in timing of said information signals; and means providing a co-ordinate error signal responsive to said error signal and each co-ordinate signal.

References Cited in the file of this patent

UNITED STATES PATENTS 2,659,823 Vossberg ---------- Nov. 17, 1953
2,679,636 Hillyer ---------- May 25, 1954
2,696,565 Shockley ---------- Dec. 7, 1954
2,703,150 Rieber ---------- Mar. 1, 1955
2,787,188 Berger ---------- Apr. 2, 1957